May 31, 1949. F. W. SPAHR ET AL  2,471,983
HYDRAULIC DRIVE FOR ROTARY GRATES AND THE LIKE
Filed Feb. 1, 1944
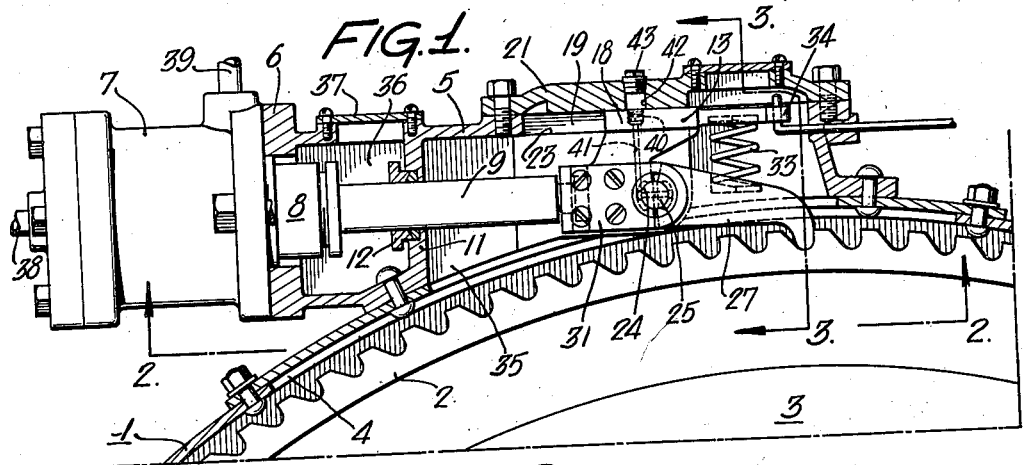
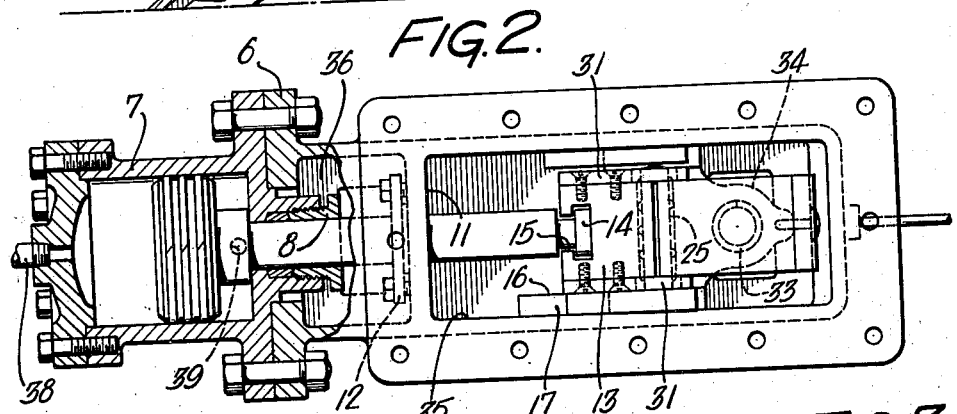
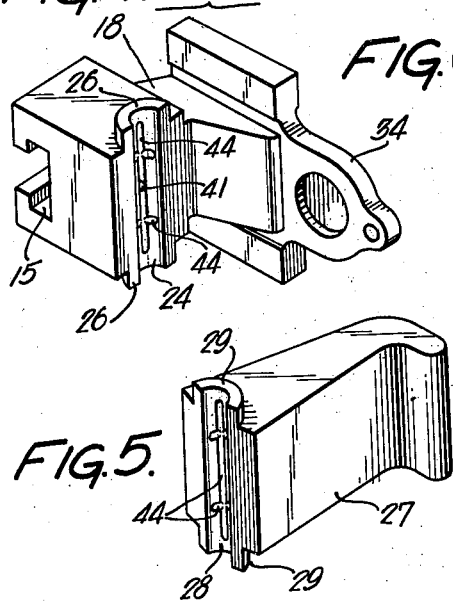
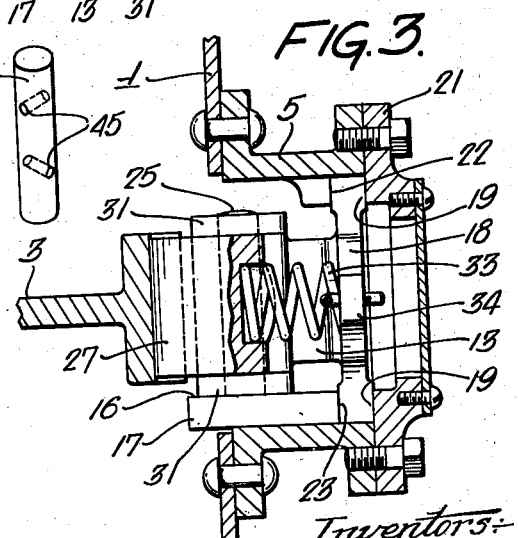
Inventors:
Floyd W. Spahr
John S. Haug
by their Attorneys
Howson + Howson Patented May 31, 1949

2,471,983

UNITED STATES PATENT OFFICE 2,471,983

HYDRAULIC DRIVE FOR ROTARY GRATES AND THE LIKE

Floyd W. Spahr, Palmyra, N. J., and John S. Haug, Chestnut Hill, Pa., assignors to United Engineers and Constructors, Inc., Philadelphia, Pa., a corporation of Delaware Application February 1, 1944, Serial No. 520,710

12 Claims. (Cl. 110—35)

A principal object of the present invention is to provide a generally improved drive mechanism for rotary grates of the general character illustrated in U. S. Patent #1,917,839.

More specifically, an object of the invention is to provide an hydraulic drive for rotary grates and the like having generally improved structural and functional characteristics.

Another object of the invention is to provide a drive mechanism of the hydraulic cylinder type wherein provision is made for isolating the part of the piston rod which traverses the pressure retaining stuffing box of the hydraulic cylinder from sources of dirt and corrosion which might otherwise be carried into the cylinder to contaminate the hydraulic medium and to thereby adversely affect the stuffing box, the piston and cylinder, and the pump for said medium.

Another object of the invention is to provide in a drive mechanism of the piston type a novel crosshead assembly having means affording ready access to and replacement of the elements of the assembly which are subject to wear.

Still another object is to provide a piston rod and crosshead assembly wherein the connection between the said rod and crosshead is self-compensating for wear tending to affect the normal alignment of the rod, said connection also providing for ready detachment of the crosshead from the rod for inspection, repair and replacement, if and when necessary.

Still another object of the invention is to provide in a drive of the stated character a pawl assembly of rugged and generally improved structural characteristics.

The invention further resides in certain structural details and arrangement hereinafter described and illustrated in the attached drawings wherein:

Fig. 1 is a fragmentary horizontal sectional view of a drive mechanism made in accordance with the invention as applied to the rotary grate of mechanical gas generator.

Fig. 2 is an elevational and partial sectional view of the drive unit detached from the generator shell as viewed from the line 2—2, Fig. 1.

Fig. 3 is a sectional view on the line 3—3, Fig. 1.

Figs. 4 and 5 are, respectively, views in perspective of the crosshead and pawl constituting elements of the drive mechanism, and Fig. 6 is a view in perspective of an element of the crosshead and pawl assembly.

With reference to the drawings, wherein the invention is illustrated in its primary application to the rotary grate of gas generator of the type disclosed in the aforesaid U. S. Patent #1,917,839, a portion of the shell of the generator is shown at 1, and the reference numeral 2 designates a segment of a ratchet which is secured to the peripheral edge of the rotary grate structure 3, the ratchet extending continuously around the periphery.

As is well-known, in such a gas generator the lower portion of the generator shell and the generator bottom encloses the grate and the lower portion of the fuel column in a housing the interior of which is in gas communication with the interior of the fuel column by way of the ash zone thereof, but which is otherwise substantially gas-tight. Due to this gas communication and due to the operation of the grate in grinding clinker and in discharging clinker and ash in the course of the gas generating operations, the housing contains a dust laden atmosphere having a relatively high concentration of corrosive components as well as a high concentration of abrasive ash particles. As is well-known, gas generating operations are usually carried out under elevated pressure conditions and frequently include gas generating runs downwardly through the generator fuel bed, so that the housing at the base of the generator frequently contains a highly combustible and explosive atmosphere under elevated pressure.

Attached to the shell 1 and overlying an opening 4 in the latter is a casing 5, said casing having a flange 6 at one end thereof to which is secured an hydraulic cylinder 7. The cylinder 7 is provided with a stuffing box 8 through which extends in conventional manner the rod 9 of a piston operating in the cylinder 7. The piston rod 9 extends through an aperture in a partition wall 11 in the casing, and this aperture is provided with a stuffing box 12. At the other side of the partition 11 the piston rod 9 is attached to a crosshead 13, the rod having at its terminal end a head portion 14 which fits slidably into a transverse T-slot 15 in the crosshead as illustrated in Figure 2. The crosshead finds a bearing 16 upon a pad 17 on the bottom wall of the casing 5 and has a flanged shoe 18 slidably fitted in guide ways 19, 19 formed between a detachable cover plate 21 and shoulders 22 and 23 in the casing. It will be noted that the connection between the piston rod 9 and the crosshead 13, and the mounting of the crosshead in the casing, are such that when the cover plate 21 is removed the crosshead may be withdrawn from the casing and from its operative connection with the said rod without disturbing the latter.

The crosshead 13 has in its forward face a cylindrical recess 24 which comprehends something less than 180°, said recess being adapted for reception of a pin 25. The crosshead also has at top and bottom thereof a projecting segmental flange 26, which flanges in effect define the upper and lower extremities of the recess. The pin 25 forms a pivot for a pawl 27, said pawl having at one end a cylindrical recess 28, also comprehending something less than 180° and forming a socket for reception of the said pin. Like the crosshead 13, the pawl has at each of its upper and lower surfaces a projecting flange 29 which define the upper and lower ends of the recess 28. Plates 31 are attached respectively to the upper and lower surfaces of the crosshead by means of screws 32 and these plates have apertures which embrace the flanges 26 and 29, as best illustrated in Figure 1, and thereby function to attach the pawl 27 to the crosshead in a manner permitting free angular movement of the pawl upon and about the axis of the pin 25 within limits prescribed by the angular extent of the recesses 24 and 28. The pawl 27 is arranged for operative engagement with the ratchet 2 and a spring 33 is confined under compression between the back of the pawl and an extension 34 of the shoe 18 and functions to hold the pawl resiliently against the toothed face of the ratchet.

It is to be noted that the casing 5 contains two chambers 35 and 36 separated by the partition 11. The chamber 35 houses the crosshead 13 and the pawl 27 and is normally closed by the cover plate 21. The chamber 36 adjoins the cylinder 7 and is normally closed by a cover plate 37. The stuffing boxes 8 and 12 are spaced apart to an extent corresponding at least to the length of the stroke of the piston so that the longitudinal portion of the piston rod which traverses the stuffing box 8 will never travel past the box 12 nor beyond the confines of the sealed chamber 36 and the cylinder 7. With this arrangement the portion of the piston rod which is alternately projected from and withdrawn into the cylinder is never exposed to contaminating dirt or corrosive atmosphere, and the cylinder with its stuffing box, the body of pressure liquid and the associated pressure pump, are thereby protected from contamination. This is of particular importance where high pressures are employed, and such pressures are necessary if unwieldy and expensive pressure cylinders are to be avoided. The arrangement insures the maintenance of a clean supply of pressure liquid and the useful life of the mechanism is thereby materially increased.

It is to be noted further that the crosshead is housed in the casing 5 in a manner such that the pressure component of the thrust on the crosshead at right angles to the piston rod is carried on the cover plate 21. Some wear on the crosshead and plate may therefore be expected, and the attachment of the crosshead to the piston rod by means of the T-slot, as described, permits change in the relative positions of the rod and the crosshead to compensate such wear and avoids misalignment of the piston rod.

The major stress upon the pawl 27 occurs on the forward or working stroke during which the grate or other rotary structure is advanced to the extent of one or more teeth as may be required. On the return stroke the only pressure is that required to overcome friction and to withdraw the pawl over the succeeding tooth or teeth of the ratchet in preparation for the ensuing working stroke. In the present instance a double-acting cylinder is employed, fluid pressure being exerted against the piston by way of ports 38 and 39 to move the piston in the advance or working stroke and in the retraction stroke respectively. Obviously, a single acting cylinder in conjunction with a spring or other retracting means might be used. The crosshead pin 25 is connected to the crosshead and to the pawl in a manner to transmit the required thrust to best advantage in the working stroke, it being noted that the crosshead bears on one entire side of the pin while the pawl bears correspondingly on the other entire side except for the relatively small clearance required for angular movement of the pawl. Shearing stress upon the pin is entirely avoided, the pin being subjected in the working stroke solely to a direct compressive force between the substantially diametrically opposed surfaces of the crosshead and pawl sockets. Substantially the full area of the pin surface is available bearing surface which is of particular importance where, as in the present case, the pressures are relatively high and the clearance small.

In order to provide the pin with adequate lubrication, and to maintain the lubrication indefinitely without necessity for interrupting the operation of the generator with which the grate is associated, we form in the crosshead 13 a lubricant passage 41 which terminates at one end in the recess 24 and at the other end in a tapped recess in the face of the shoe 18 which bears against the cover plate 21. This recess 40 is positioned for registration with an aperture 42 in the plate 21, said registration occurring in a given position in its path of travel of the crosshead. The outer end of the aperture 42 is threaded for reception of a screw plug 43 which normally closes the opening, but when the plug is removed and the aforesaid registration effected, the threaded nipple of a grease gun may be turned into the recess and lubricant injected into and through the passage 41 to the pin. Preferably, suitable grooves 44 are provided in the recesses 24 and 28 which operate in conjunction with suitably placed transverse passages 45 in the pin, see Fig. 6, to distribute the lubricant over the faces of both recesses and of the pin. By reason of the fact that when the passage 41 registers with the aperture 42 the meeting faces of the shoe 18 and cover plate 21 seal the joint, it is possible to lubricate the pin periodically without interrupting the operation of the generator.

It is to be noted, as previously set forth, that the entire crosshead and pawl assembly are accessible by removal of the cover plate 21, which plate, as previously set forth, also forms a slide bearing for the crosshead. In the event of excessive wear the cover plate may be inexpensively and quickly renewed without disassembling the drive. Also since the crosshead is attached to the piston rod by a sliding connection, the assembly can be readily withdrawn leaving the cylinder and piston rod in position. The crosshead may be reassembled in the housing with corresponding simplicity. The pin, pawl, and crosshead may be separated by removal of one of the retaining plates 31, and these parts are thus quickly and easily renewable if and when required. The pawl spring is similarly readily removable and replaceable if occasion demands.

It will be apparent that the invention produces a hydraulic drive wherein the primary working parts, including the cylinder and its stuffing box 8 and the elements of the hydraulic system associated with the cylinder, are protected against the deteriorating effects of dirt and corrosive substances emanating from the apparatus with which the mechanism may be associated or from other sources. It is to be noted also that the secondary working elements of the mechanism, inclusive of the crosshead and pawl, are mounted in a manner to afford ready access for inspection, repair or replacement as may be required. The use of a separate crosshead, and the self-adjusting connection between the crosshead and the piston rod precludes misaligning stresses on the primary elements of the mechanism and thereby avoid undue wear upon the latter. These factors, and the character of the pawl assembly, insure trouble-free operation and maximum life for the mechanism as a whole.

We claim:

1. In a drive mechanism of the character comprising a piston rod constrained to move in rectilinear path, a crosshead, a thrust-opposing slide for the crosshead, and means connecting the crosshead to the rod arranged for relative sliding movement therebetween in a direction perpendicular to said slide to compensate automatically for wear between the crosshead and said slide.

2. In a transmission mechanism of the character described, a crosshead constrained to move in a rectilinear path, a socket in the crosshead, a cylindrical pin having one side thereof fitted to the socket, a pawl having a socket fitting the opposite side of the pin, said sockets mutually embracing somewhat less than the entire circumference of the pin so as to provide for relative movements of the pawl and crosshead about the pin axis, and means for movably retaining the pawl and crosshead against the said opposite sides of the pin.

3. In a transmission mechanism of the character described, a reciprocatory member, a socket in the member, a cylindrical pin having one side thereof fitted to the socket, a pawl having a socket fitting the opposite side of the pin, said sockets mutually embracing somewhat less than the entire circumference of the pin so as to provide for relative movements of the pawl and member about the pin axis, segmental flanges projecting from the pawl and member and forming concentric pairs coaxial with the pin, and plates secured to one or other of said pawl or member and having apertures embracing the said pairs of flanges to articularly unite the pawl with the member.

4. In drive mechanism for the rotary grates of mechanical gas generators and the like comprising a reciprocating piston, a crosshead connected to said piston, a pawl carried by the crosshead, a crosshead pin forming a pivot for the pawl, and a housing enclosing said crosshead and pawl and having a slide bearing for the crosshead, the improvement which comprises a lubricant passage extending from the said pin to the face of the crosshead which seats against the slide, an aperture in the wall of said housing intersecting the face of said slide and positioned for registration with the terminal end of said passage when the crosshead occupies a given position in its path of travel in the housing, said aperture affording access to said passage from the exterior of the housing, and a detachable plug normally closing said aperture.

5. In a grate actuating mechanism for mechanical gas generators and the like of the type comprising a rotary grate enclosed in a housing the interior of which is in gas communication with the interior of the generator fuel bed but which is otherwise substantially gas-tight, said mechanism including a prime mover in the form of a pressure cylinder having a stuffing box at one end, a casing forming a support for said cylinder and secured to said housing over an opening in the latter so as to enclose said opening, said casing embracing the said stuffing box, a piston in the cylinder, and means for admitting a pressure medium to the cylinder to actuate the piston; a piston rod extending through said box and said casing for operative connection with the grate by way of said housing opening, transmission means for operatively connecting the rod with the grate, said transmission means and the adjoining portion of the rod being exposed to the corrosive and dust-laden atmosphere in the interior of the housing, a partition in said casing intermediate the stuffing box and said housing opening and forming within said casing a separate chamber for said box, an opening in said partition for passage therethrough of the piston rod, and a stuffing box on said partition embracing said rod and forming a substantially gas-tight seal segregating said chamber from said atmosphere.

6. A grate actuating mechanism in accordance with claim 5 wherein the said partition is spaced from the first-named stuffing box to an extent at least as great as the stroke of said piston whereby that portion of the rod which traverses the stuffing box of the cylinder is confined to the limits of said chamber.

7. In a transmission mechanism of the character described, a crosshead constrained to move in a rectilinear path, a ratchet-engaging pawl carried by said crosshead, a substantially gas-tight housing for the transmission and the driven mechanism within which the crosshead moves, an opening in said housing opposite said crosshead, and a detachable substantially gas-tight cover plate for said opening forming a slide for said crosshead opposing components of the thrust imposed by said pawl upon said crosshead which are exerted in a direction perpendicular to the travel thereof.

8. In a transmission mechanism of the character described having a piston rod constrained to move in a rectilinear path, a crosshead operatively connected to the rod, a substantially gas-tight housing for the transmission and the driven mechanism within which the crosshead moves, an opening in said housing opposite said crosshead, and a detachable substantially gas-tight cover plate for said opening forming a thrust-opposing slide for said crosshead, said piston rod being connected to said crosshead by a sliding connection providing for relative movement between said crosshead and said piston in a direction transverse to said rectilinear path to compensate for wear between said crosshead and said slide.

9. In transmission mechanism of the character described, a piston rod constrained to move in a rectilinear path, a crosshead operatively connected to said piston rod, a substantially gas-tight housing for said transmission and the driven mechanism within which move said crosshead and that end of the piston rod connected thereto, an opening in said housing opposite said crosshead, a substantially gas-tight detachable cover head for said opening forming a thrust-opposing slide for said crosshead, said piston being detachably interlocked with said crosshead by a sliding connection including an undercut head on the rod and a corresponding undercut slot in the crosshead for the reception of said head and extending in a direction substantially at right angles to the face of said slide.

10. In grate drive mechanism for rotating a mechanical gas generator grate, said grate being arranged to support an ignited column of solid fuel and being rotatable about a vertical axis to grind clinker and discharge clinker and ash from the periphery of the base thereof, and said grate being enclosed laterally and beneath by a housing the interior of which is in gas communication with the interior of said fuel column by way of the ash zone thereof but which is otherwise substantially gas-tight; a horizontal ratchet wheel attached to said grate, a pawl engaging said ratchet wheel to effect rotation of said grate about said vertical axis; a piston rod-driven crosshead operatively connected to said pawl and constrained to move rectilinearly to rotate said ratchet wheel by means of said pawl, said ratchet wheel and pawl and crosshead being located within said housing and being exposed to the corrosive ash-laden combustible gaseous atmosphere existing therein by reason of the gas communication between the interior of said housing and the interior of said fuel column and by reason of the operation of said grate in discharging ash, a lateral opening in said housing opposite said crosshead, and a substantially gas-tight detachable cover plate for said opening affording a slide in said housing for said crosshead which opposes the horizontal thrust of said pawl on said crosshead transverse to the travel thereof due to the resistance of the lower portion of said fuel column to the rotation of said grate.

11. In drive mechanism for rotating a mechanical gas generator grate about a vertical axis at the base of an ignited column of solid fuel to grind clinker and to discharge clinker and ash from the periphery thereof, said grate being enclosed below and laterally in a housing the interior of which is in gas communication with the interior of said fuel column by way of the ash zone thereof but which is otherwise substantially gas-tight, said grate having a peripheral pawl-driven ratchet wheel attached thereto, and said drive having a prime mover including a pressure cylinder provided with a piston operating therein; a piston rod connected to said piston and extending from said cylinder through a cylinder stuffing box into said housing by way of a gas-tight seal spaced from said stuffing box; and transmission means in said housing operatively connecting said rod with said pawl, said transmission means and the adjoining portion of said piston rod being exposed to the corrosive and abrasive combustible gaseous atmosphere existing in said housing by reason of the gas communication between the interior thereof and the interior of said fuel column and by reason of the operation of said grate in the discharge of ash; said piston rod being sufficiently long and said cylinder stuffing box and said gas-tight seal being sufficiently spaced from each other so as to prevent contact between the corrosive and abrasive components of said gaseous atmosphere in said housing on the one hand and said stuffing box and the portion of said rod which traverses it on the other hand.

12. In a drive for a mechanical gas generator grate, a ratchet wheel attached to the grate, a pawl engaging said ratchet wheel to rotate said grate thereby, a crosshead constrained to move in a rectilinear path and carrying said pawl, a reciprocating piston rod operatively connected to said crosshead to reciprocate the same in said path and a piston connected to said piston rod and operating in a pressure cylinder to reciprocate said rod.

FLOYD W. SPAHR.
JOHN S. HAUG.

REFERENCES CITED

The following references are of record in the file of this patent:

UNITED STATES PATENTS

| Number | Name | Date |
|---|---|---|
| 414,114 | Hostler | Oct. 29, 1889 |
| 696,920 | Allfree | Apr. 8, 1902 |
| 818,277 | McElvaney | Apr. 17, 1906 |
| 935,235 | Sargent | Sept. 28, 1909 |
| 957,920 | Wassman | May 17, 1910 |
| 1,405,814 | Aram | Feb. 7, 1922 |
| 1,604,793 | Stratton | Oct. 26, 1926 |
| 1,611,159 | Buvinger et al. | Dec. 21, 1926 |
| 1,627,715 | Stowe | May 10, 1927 |
| 1,819,887 | Fry et al. | Aug. 18, 1931 |
| 1,832,459 | Haniman | Nov. 17, 1931 |
| 1,845,257 | Ferris | Feb. 16, 1932 |
| 1,846,299 | Bristol | Feb. 23, 1932 |
| 1,874,618 | Prince | Aug. 30, 1932 |
| 1,975,293 | Roland | Oct. 2, 1934 |
| 1,977,665 | Beers | Oct. 23, 1934 |
| 2,013,680 | Bennett | Sept. 10, 1935 |
| 2,157,124 | Hanna | May 9, 1939 |
| 2,180,196 | Corbett | Nov. 14, 1939 |
| 2,190,581 | Wineman | Feb. 13, 1940 |